(12) United States Patent
     Eloff et al.

(10) Patent No.: US 12,668,306 B2
(45) Date of Patent: Jun. 30, 2026

(54) CHASSIS FOR ELECTRIC VEHICLE

(71) Applicant: The Shyft Group, Inc., Charlotte, MI (US)

(72) Inventors: Johann Pieter Eloff, Fort Wayne, IN (US); Samuel Francis Colalillo, Jr., New Carlisle, IN (US); Steven Rudolph, Granger, IN (US)

(73) Assignee: The Shyft Group, Inc., Charlotte, MI (US)

( * ) Notice: Subject to any disclaimer, the term of this patent is extended or adjusted under 35 U.S.C. 154(b) by 506 days.

(21) Appl. No.: 18/177,800

(22) Filed: Mar. 3, 2023

(65) Prior Publication Data

US 2023/0278632 A1     Sep. 7, 2023

Related U.S. Application Data

(60) Provisional application No. 63/316,455, filed on Mar. 4, 2022.

(51) Int. Cl.
     B62D 21/03 (2006.01)
     B62D 25/20 (2006.01)
(52) U.S. Cl.
     CPC ............. B62D 21/03 (2013.01); B62D 25/20 (2013.01)
(58) Field of Classification Search
     CPC ...... B62D 21/03; B62D 25/20; B62D 33/046; B62D 25/2054
     See application file for complete search history.

(56) References Cited

U.S. PATENT DOCUMENTS

| | | | |
|---|---|---|---|
| 4,838,605 A * | 6/1989 | Abromavage ..... | B62D 25/2054 |
| | | | 105/422 |
| 10,053,153 B2 * | 8/2018 | Kobayashi ............. | B60L 50/66 |
| 2007/0296248 A1 | 12/2007 | Kuriakose | |
| 2018/0056769 A1 | 3/2018 | Kerspe et al. | |
| 2021/0129917 A1 | 5/2021 | Sagarsee | |
| 2021/0218101 A1 | 7/2021 | Menon et al. | |

FOREIGN PATENT DOCUMENTS

| | | |
|---|---|---|
| EP | 2712748 A1 | 4/2014 |
| WO | WO 2004/020268 A1 | 3/2004 |

OTHER PUBLICATIONS

International Search Report & Written Opinion—Dated Sep. 21, 2023; US2023/014429; Filed Mar. 3, 2023.

* cited by examiner

*Primary Examiner* — Lori Lyjak
(74) *Attorney, Agent, or Firm* — Barnes & Thornburg LLP

(57) ABSTRACT

An electronic vehicle is disclosed with a vehicle body having a cab portion and a rear cargo portion. The rear cargo portion includes a floor comprising a plurality of floor planks. The vehicle includes a chassis with a first rail and a second rail extend along a longitudinal axis of the vehicle body. There are one or more connection points between the first rail, second rail, and the floor such that at least a portion of the first and second rail are adjacent the floor without any interposed structure therebetween.

9 Claims, 6 Drawing Sheets

CHASSIS FOR ELECTRIC VEHICLE

RELATED APPLICATIONS

This application claims the benefit of U.S. Provisional Application Ser. No. 63/316,455 filed Mar. 4, 2022 entitled "Chassis for Electronic Vehicle," which is hereby incorporated by reference in its entirety.

TECHNICAL FIELD

This disclosure relates generally to a chassis for an electric vehicle (EV); in particular, this relates to a chassis for an electric fleet vehicle, such as a delivery truck, walk-in van, mobile retail vehicle, mass transit, etc.

BACKGROUND

Many commercial vehicles, such as fleet vehicles, are transitioning from internal combustion engines (ICE) to electronically-propelled vehicles (EVs). Although this transition presents many opportunities, there are also obstacles. For example, EVs include many critical components that are not located in the engine bay like ICE vehicles. Instead, these critical systems can be spread out throughout the lateral extremities lengthwise of the vehicle. This can create challenges to protection of critical components of EVs, particular in a side-impact collision.

Therefore, there is a need for an EV vehicle with a chassis that overcome one or more of the challenges discussed herein.

SUMMARY

According to one aspect, this disclosure provides an electronic vehicle. In some embodiments, the electronic vehicle includes a vehicle body with a cab portion and a rear cargo portion. The rear cargo portion includes a floor comprising a plurality of floor planks. The vehicle includes a chassis with a first rail and a second rail extend along a longitudinal axis of the vehicle body. There are one or more connection points between the first rail and the floor such that at least a portion of the first rail is adjacent the floor without any interposed structure therebetween. There are also one or more connection points between the second rail and the floor such that at least a portion of the first rail is adjacent the floor without any interposed structure therebetween.

According to another aspect, this disclosure provides a chassis for an electronic vehicle. In some cases, the chassis includes a first longitudinally extending rail, a second longitudinally extending rail, a plurality of wheels with a single rear wheel configuration, an one or more batteries. The chassis includes an electronic drive system configured to draw power from the one or more batteries and drive at least a portion of the plurality of wheels. In some embodiments, the one or more batteries and the electronic drive system are positioned fully between the first and second longitudinally extending rails.

According to yet another aspect, this disclosure provides a method of assembling a chassis for an electronic vehicle. The method may include the step of providing a vehicle body comprising a cab portion and a rear cargo portion, wherein at least the rear cargo portion includes a floor comprising a plurality of floor planks, wherein at least a portion of the floor planks include a base portion and an opposing tread portion. There is a step of providing a chassis rail with a flange. The method includes aligning an opening in a flange of the chassis rail with an opening in a floor plank of the plurality of floor planks. The chassis rail is connected directly to at least a portion of the plurality of floor planks without any intervening structure between the chassis rail and the plurality of floor planks.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
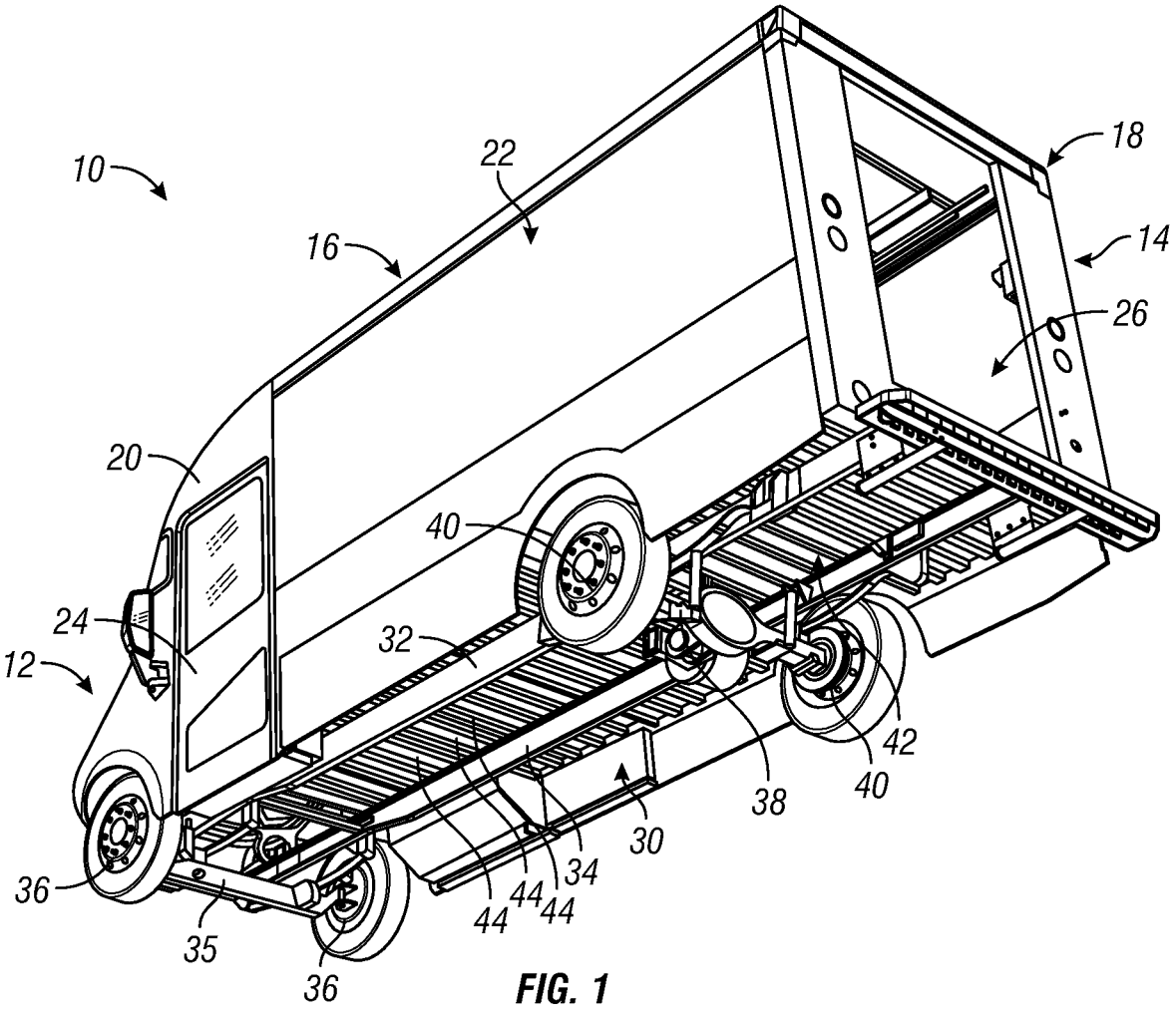
FIG. 1 is a driver-side rear perspective view of an example electric vehicle (EV) from underneath to expose at least a portion of an example chassis according to an embodiment of this disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

This disclosure relates generally to a chassis for an electronic vehicle (EV). In some cases, the disclosure is directed to an improved EV. Although the example chassis is shown mounted to a walk-in van, other types of commercial and fleet vehicles, cargo vehicles, mobile retail vehicles, etc. could be used in conjunction with the example chassis.

In some embodiments, the chassis includes longitudinally-extending chassis rails that are directly attached to the floor of the EV. The cross-members and all internal brackets of the chassis are configured to allow clearance for this direct connection; in other words, the cross-members and internal brackets do not extend above the top of the rails, which may obstruct the connection between the rails and floor. There are a variety of technical advantages to the direct connection between the chassis rails and floor. For example, this eliminates the need for risers being interposed between the floor and chassis. By eliminating risers, this provides to weight savings and lowers the body floor height for improved ingress/egress and package handling for the driver/passenger(s).

In some embodiments, the chassis has a single rear wheel configuration (i.e., single driver-side rear wheel and single passenger-side rear wheel) instead of a dual wheel configuration (i.e., two driver-side rear wheels and two passenger-side rear wheels). This allows a wider frame for the chassis (i.e., wider distance between the longitudinally-extending chassis rails). The wide frame format provides numerous technical advantages. For example, the wide frame format allows the chassis design to be battery agnostic; in other words, the wider space between the chassis rails can accommodate a wide variety of battery sizes and shapes therebetween. The wider frame also allows the battery and other critical systems to be placed between the rails for protection instead of outside the rails where they are exposed during a collision. Since the critical components can be positioned higher between the rails, instead of underneath, this also improves ground clearance/breakover angle. Additionally, the wider frame rail configuration increases the front and rear suspension lateral distance (spring track) which provides improved handling characteristics (increased roll stiffness=less body roll in a turn/avoidance maneuver).

Figure 2:
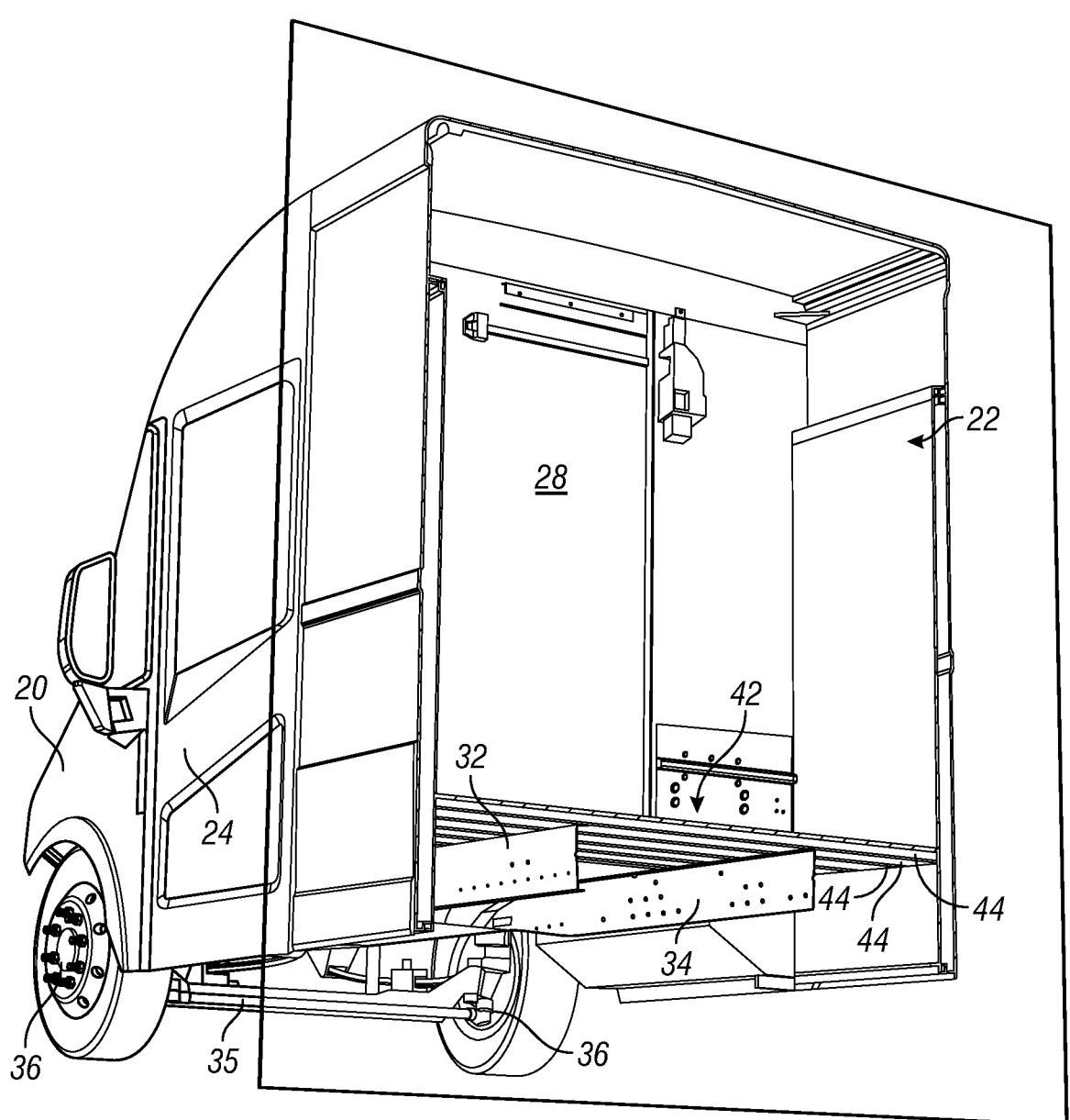
FIG. 2 is perspective view of the example EV of FIG. 1 that has been cross-sectioned laterally through the rear storage compartment to show, among other things, the direct connection between the floor and chassis rails according to an embodiment of this disclosure.

Referring to FIG. 1, there is shown an example electric vehicle (EV) 10 with a front end 12, a back end 14, a driver-side 16, and a passenger side 18. As shown, the EV 10 has a body with a cab 20 and a rear cargo area 22. The cab 20 is accessible through a driver door 24 and/or a passenger door (not shown). The rear cargo area 22 is accessible through a rear opening 26, which could be selectively opened/closed with a rear door (not shown). In some cases, the rear cargo area 22 may also be accessible from the cab 20 through a bulkhead door 28 (FIG. 2). Although the example EV 10 is embodied as a walk-in van, other types of fleet vehicles or other commercial vehicles could be fitted with the chassis discussed herein.

In the embodiment shown, an example chassis 30 can be seen underneath the EV 10. As shown, the chassis 30 includes a first rail 32 and a second rail 34 that extend longitudinally substantially the entire length of the EV 10. Towards a front end of the chassis 30 is a front axle 35 to which are connected front wheels 36. The chassis 30 includes a rear axle 38 to which rear wheels 40 are connected. In the embodiment shown, the chassis 30 has a single rear wheel configuration. The term "single rear wheel configuration" means that there is a single wheel extending from each side of the rear axle 38 (i.e., two total rear wheels). This stands in contrast to existing vehicles with two wheels extending from each side of the rear axle (i.e., four total rear wheels).

In the embodiment shown, the chassis 30 is connected with a floor 42 of the rear cargo area 22. As shown, the floor 42 is formed from a plurality of transversely oriented floor planks 44 and there are a plurality of connection points along the rails 32, 34 with a plurality of the floor planks 44.

Figure 3:
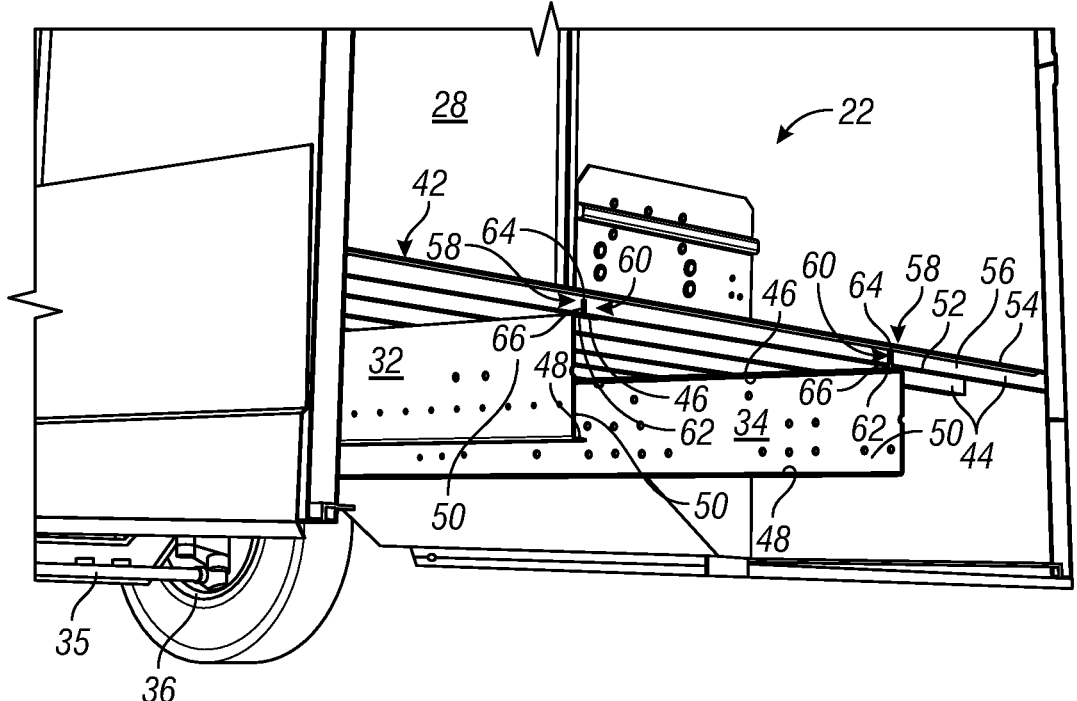
FIG. 3 is a detailed view of the connection between the floor and chassis rails shown in FIG. 2.

Referring now to FIGS. 2 and 3, the rear cargo area 22 has been cross-sectioned to show connection points between the rails 32, 34 and a floor plank 44 of the floor 42. As discussed herein, there are a plurality of connection points between the rails 32, 34 and floor planks 44 substantially along the entire length of the rails. In the embodiment shown, the rails 32, 34 are formed as C-channels with a top flange 46 and a bottom flange 48 connected by a web 50. The floor planks 44 include a base 52 and an opposing tread 54 connected by a leg 56. In the embodiment shown, the top flange 46 of the rails 32, 34 are directly connected to the base 52 of the floor plank 44 with a fastener 58. In other words, the top flange 46 is adjacent to the base 52 of the floor plank 44. Typically, there is no riser or other structure between the top flange 46 of the rails 32, 34 and the base 52 of the floor plank 44 at the connection point. This provides weight savings and lowers the height of the floor 42 for improved ingress/egress and package handling in the rear cargo area 22.

In some embodiments, the fastener 58 may be a pin and collar type connector, such as a Magnagrip pin/collar fastener. This type of connector has a bolt 60 with a head 62 and a shank 64 that is captured by the collar 66. In some cases, the pin/bolt fastener 58 is installed from the bottom up with the head 62 of the bolt/pin 60 underneath the top flange 46 of the rails 32, 34 and the shank 64 moved upward through an opening in the top flange 46 aligned with an opening in the base 52 of the floor plank 44 where there is a collar 66 to capture the bolt/pin. In some embodiments, the chassis 30 is configured so all internal brackets and cross-members are positioned to allow clearance for this direct connection between the rails 32, 34 and floor planks 44.

Figure 4:
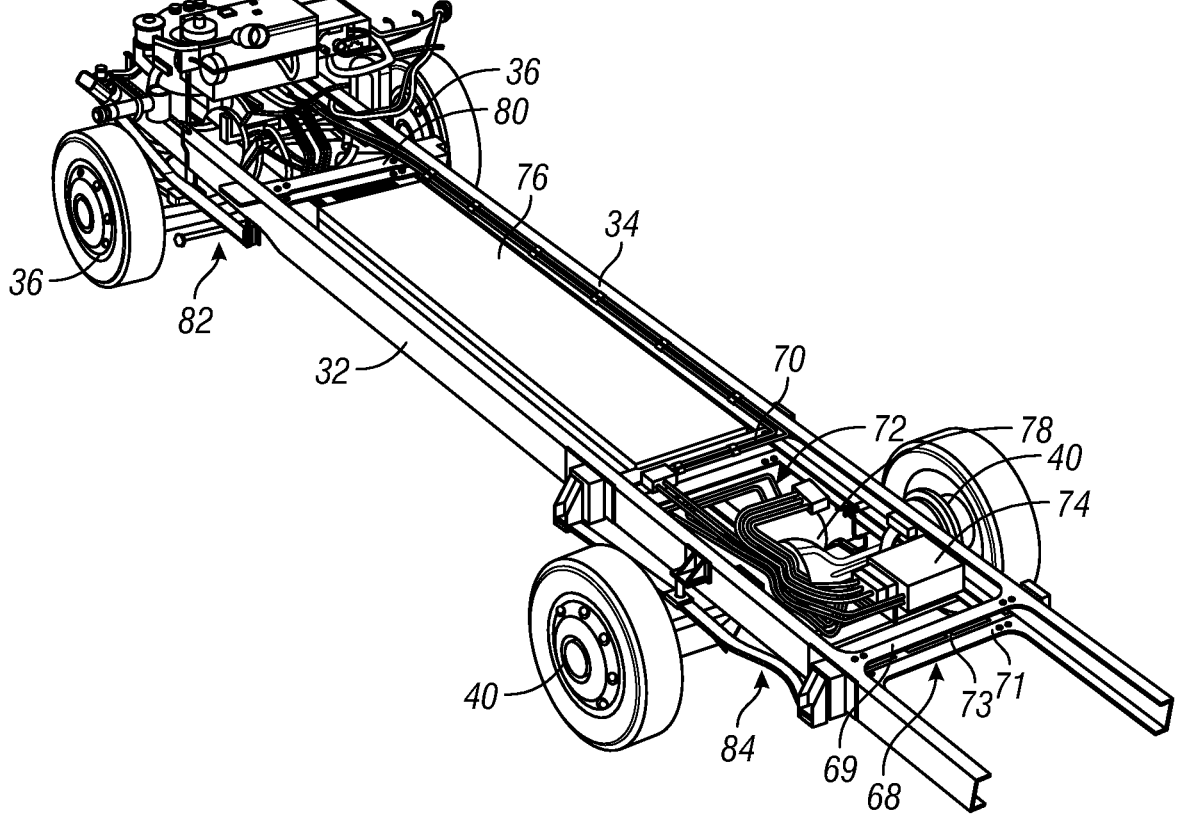
FIG. 4 is a driver-side rear perspective view of an example chassis for an EV according to an embodiment of this disclosure.

Referring now to FIG. 4, there is shown the chassis 30 of the EV 10 with the body removed. As can be seen, in some embodiments of this disclosure there is a single rear wheel configuration. The single rear wheel configuration allows a wider width between the rails 32, 34 than a typical chassis which has a dual rear wheel configuration. In some cases, instead of having the width being approximately 32 inches as is typical of existing chassis of walk-in vans, the chassis 30 has a width of approximately 40 inches between the rails

32, 34. Of course, the width between the rails 32, 34 may be greater or less than 40 inches depending on the circumstances.

In the example shown, there is a first cross member 68 and a second cross member 70 that both extend transversely between the rails 32, 34 to provide structural support. In some cases, the cross members 68, 70 may include an upper member 69 that extends transversely to connect with the top flanges 46 of the rails 32, 34. The cross members 68, 70 may also include a lower member 71 that extends transversely to connect with the bottom flanges 48 of the rails 32, 34. As shown, there are linkages 73 between the upper and lower members 69, 71 of the cross members 68, 70 to provide structural support.

As shown, an electronic drive system 72 is positioned between the cross members 68, 70. For example, the electronic drive system 72 may include an inverter 74 that receives DC power from batteries 76 to supply AC power to an AC motor 78 connected to a driveshaft that drives the rear wheels 40. In the example shown, the batteries 76 are positioned between the second cross member 70 and a third cross member 80.

In some embodiments, one or more of the critical systems, such as the batteries 76, electronic drive system 72, inverter 74, AC motor 78, battery control management systems, battery thermal management systems and high voltage (HV) cables) and/or other critical components, for the EV 10 are protected between the rails 32, 34. This can be particularly advantageous in a side impact collision. As shown, the batteries 76 are positioned fully between the rails 32, 34 which provides protection to the batteries in the event of the collision. Likewise, the electronic drive system 72 has all components positioned between the rails 32, 34. This stands in contrast to existing chassis for electrical vehicles in which one or more critical components may be mounted outside the rails instead of being fully between the rails 32, 34 as shown in this embodiment. The ability to house each of these critical components between the rails 32, 34 is a benefit of the wider configuration between the rails 32, 34 as discussed herein. Another technical benefit to this configuration is the ability to accommodate a variety of sizes and shapes for batteries 76, which means this embodiment of the chassis 30 is battery type/size agnostic.

Figure 5:
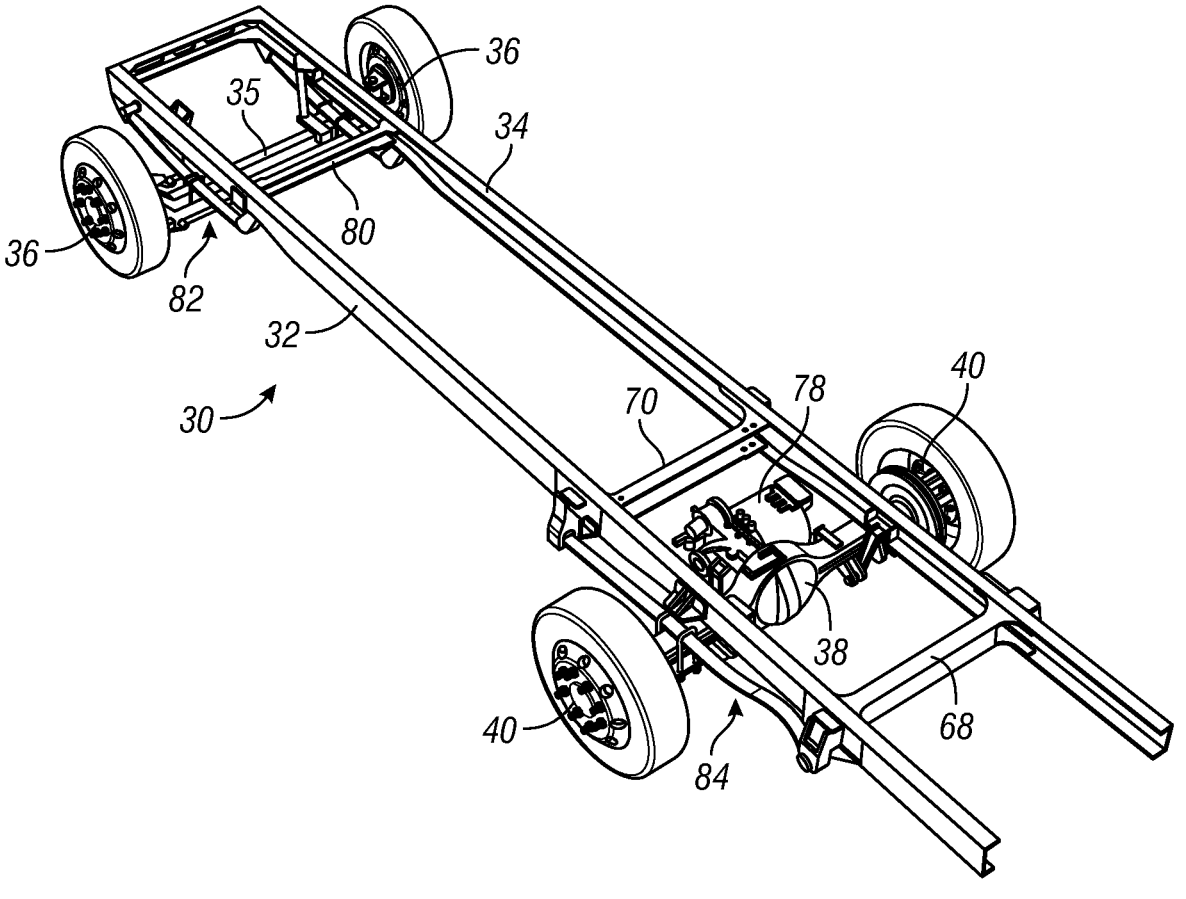
FIG. 5 a driver-side rear perspective view of the example chassis shown in FIG. 4 with certain components removed.
Figure 6:
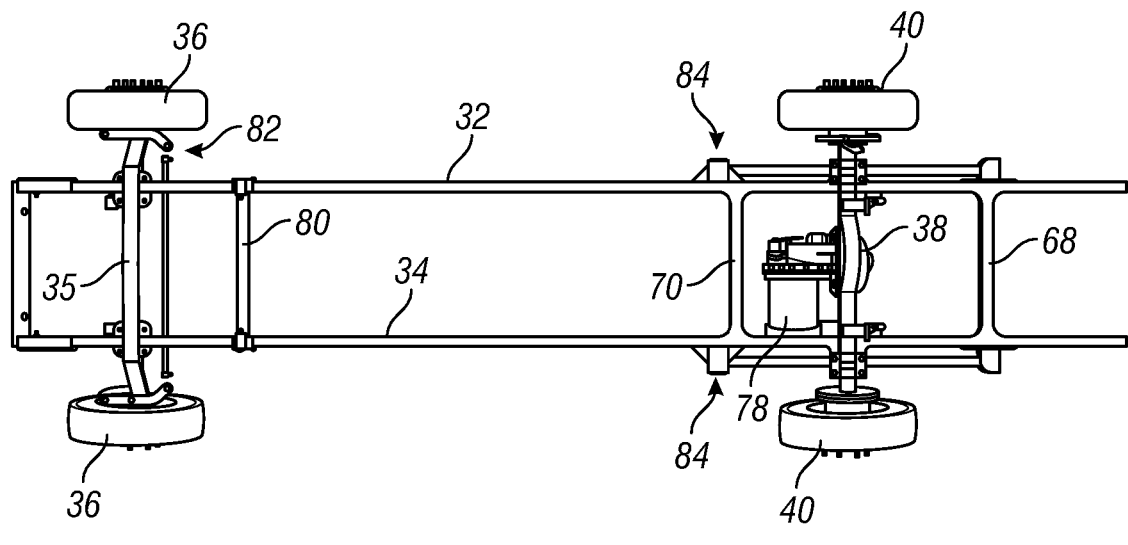
FIG. 6 is a bottom view of the example chassis shown in FIG. 5.

Referring also to FIGS. 5 and 6, the chassis 30 includes a front suspension system 82 and a rear suspension system 84 mounted to the rails 32, 34. As explained herein, in the embodiment shown with a wider space between the rails 32, 34, this provides benefits to the suspension systems 82, 84 from being spread further apart. For example, this increases the front and rear suspension system 82, 84 lateral distance (spring track) to provide improved handling characteristics due to increased roll stiffness.

Figure 7:
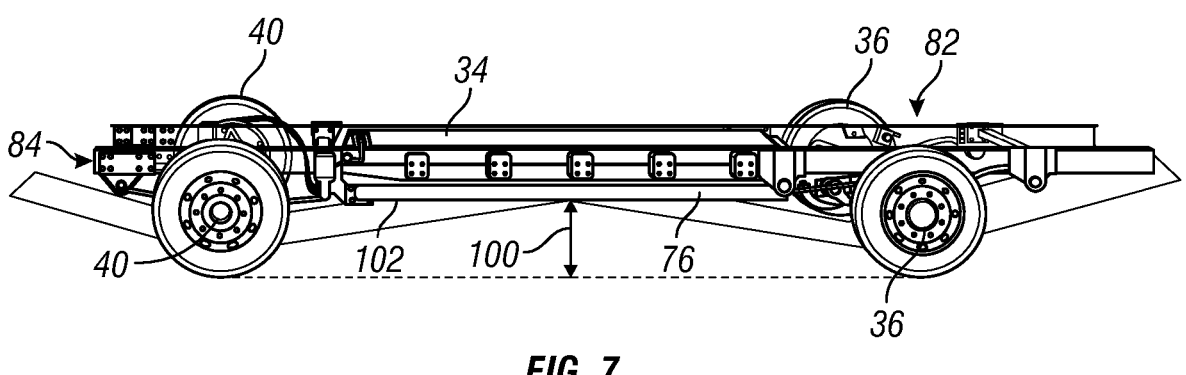
FIG. 7 is a passenger-side view of the example chassis shown in FIG. 4 to illustrate improved breakover angle.

Referring now to FIG. 7, there is shown a side view of the chassis 30. As can be seen, the batteries 76 and other critical components, such as AC motor 78, are positioned higher within the rails 32, 34 instead of underneath the rails. By having these components positioned higher on the chassis 30, this increases ground clearance, which is indicated by line 100. This improves the breakover angle for the EV 10, which is indicated by the line 102.

The invention claimed is:

1. An electronic vehicle comprising:
   a vehicle body comprising a cab portion and a rear cargo portion, wherein at least the rear cargo portion includes a floor comprising a plurality of elongated floor planks each with a base portion and an opposing tread portion;

a bulkhead door separating the cab portion and the rear cargo portion, wherein the bulkhead door is movable between an open position that allows access between the cab portion and the rear cargo portion and a closed position that prevents access between the cab portion and the rear cargo portion;
   a chassis comprising a first rail with a top flange and a second rail with a top flange, wherein the first rail and the second rail both extend along a longitudinal axis of the vehicle body, wherein the plurality of elongated floor planks extend approximately transversely to the first rail and the second rail, wherein the top flange of the first rail and the top flange of the second rail are adjacent to the base portion of the plurality of elongated floor planks without any interposed structure therebetween;
   a plurality of connectors connecting the first rail and/or the second rail to the plurality of elongated floor planks, wherein the plurality of connectors extend through: (i) the top flange of the first rail and/or the top flange of the second rail; and (ii) the base portion of a respective floor plank of the plurality of floor planks; and
   wherein the plurality of connectors have a distal end captured within respective floor planks of the plurality of floor planks and the distal end does not extend through the tread portion.

2. The electronic vehicle of claim 1, wherein at least a portion of the plurality of connectors comprise pin and collar type connectors.

3. The electronic vehicle of claim 2, wherein the pin and collar type connectors include a shank portion extending from a head and a collar to capture the shank portion.

4. The electronic vehicle of claim 3, wherein the shank portion extends through the top flange and the base portion.

5. The electronic vehicle of claim 4, wherein the head is adjacent to the top flange.

6. The electronic vehicle of claim 5, wherein the collar is between the base portion and the opposing tread portion.

7. The electronic vehicle of claim 6, further comprising a battery and an electronic drive system configured to draw power from the battery to drive at least a portion of a plurality of wheels.

8. The electronic vehicle of claim 7, wherein the battery and electronic drive system is completely between the first rail and the second rail.

9. A method of assembling a chassis for an electronic vehicle, the method comprising:
   providing a vehicle body comprising a cab portion and a rear cargo portion, wherein at least the rear cargo portion includes a floor comprising a plurality of floor planks, wherein at least a portion of the floor planks include a base portion and an opposing tread portion;
   providing a chassis rail with a flange;
   aligning an opening in the flange of the chassis rail with an opening in a floor plank of the plurality of floor planks;
   connecting the chassis rail directly to at least a portion of the plurality of floor planks without any intervening structure between the chassis rail and the plurality of floor planks; and
   wherein connecting the chassis rail to at least a portion of the plurality of floor planks comprises: inserting a shank portion of the connector from underneath the chassis rail through the opening in the flange and into an opening in the base portion of a floor plank of the plurality of floor planks such that a head of the shank portion is adjacent to the flange and at least a portion of the connector is captured within the floor plank without extending through the tread portion.

\* \* \* \* \*